United States Patent
Tu

(10) Patent No.: US 9,973,985 B2
(45) Date of Patent: *May 15, 2018

(54) METHOD FOR CELL HANDOVER, BASE STATION DEVICE AND COMMUNICATION SYSTEM

(71) Applicant: HUAWEI TECHNOLOGIES CO., LTD., Shenzhen (CN)

(72) Inventor: Jing Tu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 129 days.

This patent is subject to a terminal disclaimer.

(21) Appl. No.: 15/076,075

(22) Filed: Mar. 21, 2016

(65) Prior Publication Data
US 2016/0205597 A1 Jul. 14, 2016

Related U.S. Application Data

(63) Continuation of application No. 13/974,496, filed on Aug. 23, 2013, now Pat. No. 9,326,200, which is a (Continued)

(30) Foreign Application Priority Data

Feb. 23, 2011 (CN) .......................... 2011 1 0044821

(51) Int. Cl.
*H04W 36/00* (2009.01)
*H04W 24/10* (2009.01)
(Continued)

(52) U.S. Cl.
CPC ....... *H04W 36/0077* (2013.01); *H04L 1/0025* (2013.01); *H04L 1/0026* (2013.01);
(Continued)

(58) Field of Classification Search
None
See application file for complete search history.

(56) References Cited

U.S. PATENT DOCUMENTS

2002/0012383 A1 1/2002 Higuchi et al.
2006/0234676 A1 10/2006 Harris et al.
(Continued)

FOREIGN PATENT DOCUMENTS

CN 1332543 1/2002
CN 101141157 3/2008
(Continued)

OTHER PUBLICATIONS

Japanese Notice of Allowance dated Sep. 24, 2016 in corresponding to Japanese Patent Application No. 2013-554784.
(Continued)

*Primary Examiner* — Christine Duong
(74) *Attorney, Agent, or Firm* — Staas & Halsey LLP

(57) ABSTRACT

Embodiments of the present invention provide a method, an apparatus, and a base station device for detecting uplink power. The method includes: detecting a modulation and coding scheme and an initial block error rate of an uplink data packet sent by a user equipment; determining, according to a relationship between an index of the detected modulation and coding scheme of the uplink data packet sent from the UE and a first threshold, and a relationship between the detected initial block error rate of the uplink data packet sent from the UE and a second threshold, whether uplink power of the user equipment is restricted.

10 Claims, 2 Drawing Sheets

Related U.S. Application Data continuation of application No. PCT/CN2012/071508, filed on Feb. 23, 2012.

(51) Int. Cl.
*H04W 52/26* (2009.01)
*H04W 52/36* (2009.01)
*H04W 36/24* (2009.01)
*H04L 1/00* (2006.01)
*H04W 52/14* (2009.01)
*H04B 17/382* (2015.01)

(52) U.S. Cl.
CPC .......... *H04W 24/10* (2013.01); *H04W 36/24* (2013.01); *H04W 52/262* (2013.01); *H04W 52/265* (2013.01); *H04W 52/367* (2013.01); *H04B 17/382* (2015.01); *H04L 1/0045* (2013.01); *H04W 52/146* (2013.01)

(56) References Cited

U.S. PATENT DOCUMENTS

| | | | |
|---|---|---|---|
| 2007/0019668 A1 | 1/2007 | Lee et al. | |
| 2007/0076696 A1* | 4/2007 | An | H04L 29/06027 370/352 |
| 2010/0111008 A1 | 5/2010 | Ishii | |
| 2010/0271963 A1 | 10/2010 | Koorapaty et al. | |
| 2011/0183672 A1* | 7/2011 | Jeong | H04W 36/30 455/436 |
| 2013/0336288 A1 | 12/2013 | Tu | |

FOREIGN PATENT DOCUMENTS

| | | |
|---|---|---|
| CN | 101340213 | 1/2009 |
| CN | 101711054 | 5/2010 |
| CN | 101873603 | 10/2010 |
| CN | 102088725 | 6/2011 |
| EP | 2234308 | 9/2010 |
| EP | 2384064 | 11/2011 |
| JP | 2007-28637 | 2/2007 |
| KR | 10-2009-0109699 | 10/2009 |
| WO | 2008/108227 A1 | 9/2008 |
| WO | WO 2010/083646 | 7/2010 |
| WO | WO 2011/019924 | 2/2011 |

OTHER PUBLICATIONS

International Search Report dated May 24, 2012 in corresponding International Application No. PCT/JP2012/071508.
International Search Report dated Feb. 23, 2012 in corresponding International Application No. PCT/CN2012/071508.
Chinese Office Action dated Jun. 27, 2013 in corresponding Chinese Application No. 201110044821.1.
Extended European Search Report, dated Mar. 20, 2014, in corresponding European Application No. 12749477.1 (6 pp.).
Notice of Allowance issued in copending U.S. Appl. No. 13/974,496 dated Feb. 10, 2016.
Advisory Action issued in copending U.S. Appl. No. 13/974,496 dated Dec. 24, 2015.
Office Action issued in copending U.S. Appl. No. 13/974,496 dated Oct. 2, 2015.
Office Action issued in copending U.S. Appl. No. 13/974,496 dated May 7, 2015.
U.S. Appl. No. 13/974,496, filed Aug. 23, 2013, Jing Tu, Huawei Technologies Co., Ltd.

* cited by examiner

METHOD FOR CELL HANDOVER, BASE STATION DEVICE AND COMMUNICATION SYSTEM

CROSS-REFERENCE TO RELATED APPLICATIONS

This application is a continuation of U.S. patent application Ser. No. 13/974,496, filed on Aug. 23, 2013, which is a continuation of International Application No. PCT/CN2012/071508, filed on Feb. 23, 2012, which claims priority to Chinese Patent Application No. 201110044821.1, filed on Feb. 23, 2011. The afore-mentioned patent applications are hereby incorporated by reference in their entireties.

TECHNICAL FIELD

The present invention relates to the field of wireless communication technologies, and in particular, to a method for cell handover, a base station device and a communication system.

BACKGROUND

When network coverage is restricted, a base station triggers a cell handover. An existing cell handover is triggered based on the downlink signal quality, that is, when the downlink signal quality is lower than a threshold, a user equipment (User Equipment, hereinafter briefly referred to as UE) is triggered to perform a cell handover. In a network plan, however, a phenomenon of imbalance between uplink power and downlink power exists. As a result, a situation where uplink coverage is restricted earlier than downlink coverage may occur. That is to say, when the downlink coverage is not restricted, the uplink coverage is already restricted. Particularly, in a scenario where interference exists in the uplink, the uplink transmit power of a UE is more probably restricted earlier than the downlink, thereby causing the uplink coverage to be restricted earlier than the downlink coverage. If the uplink transmit power of the UE is restricted, call drop is likely to occur.

A cell handover manner in the prior art has the following problems: a handover is triggered based on the downlink signal quality, and an uplink signal restriction situation cannot be accurately characterized. When uplink coverage is restricted earlier than downlink coverage, because the downlink signal quality does not reach a threshold that triggers a handover, a handover is not triggered, thereby causing a UE to be prone to call drop. Therefore, a method for detecting whether uplink power is restricted needs to be provided, so that a handover can be triggered when it is detected that uplink power is restricted.

SUMMARY

Embodiments of the present invention provide a method for cell handover, a base station device and a communication system.

The embodiments of the present invention may be specifically implemented by the following technical solutions:

In one aspect, a method for detecting uplink power is provided. The method includes:

detecting a modulation and coding scheme and an initial block error rate of an uplink data packet sent by a user equipment; and determining, according to a relationship between an index of the detected modulation and coding scheme of the uplink data packet sent by the user equipment and a first threshold, and a relationship between the detected initial block error rate of the uplink data packet sent by the user equipment and a second threshold, whether uplink power of the user equipment is restricted.

An apparatus for detecting uplink power is further provided. The apparatus includes:

a detecting unit, configured to detect a modulation and coding scheme and an initial block error rate of an uplink data packet sent by a user equipment; and a determining unit, configured to determine, according to a relationship between an index of the detected modulation and coding scheme of the uplink data packet sent by the user equipment and a first threshold, and a relationship between the detected initial block error rate of the uplink data packet sent by the user equipment and a second threshold, whether uplink power of the user equipment is restricted.

In another aspect, a base station device is further provided, including any one of the apparatuses for detecting uplink power that are provided by the embodiments of the present invention.

According to the method, apparatus, and base station device for detecting uplink power that are provided by the embodiments of the present invention, the base station device detects a modulation and coding scheme and an initial block error rate of an uplink data packet sent by a UE, and can determine, according to a relationship between an index of the detected modulation and coding scheme and a first threshold, and a relationship between the detected initial block error rate and a second threshold, whether uplink power of the user equipment is restricted, thereby accurately characterizing an uplink signal restriction situation of the UE.

DESCRIPTION OF EMBODIMENTS

To make the objectives, technical solutions, and advantages of the present invention more clear and comprehensible, the following further describes in detail the technical solutions of the present invention with reference to the accompanying drawings and embodiments.

Figure 1:
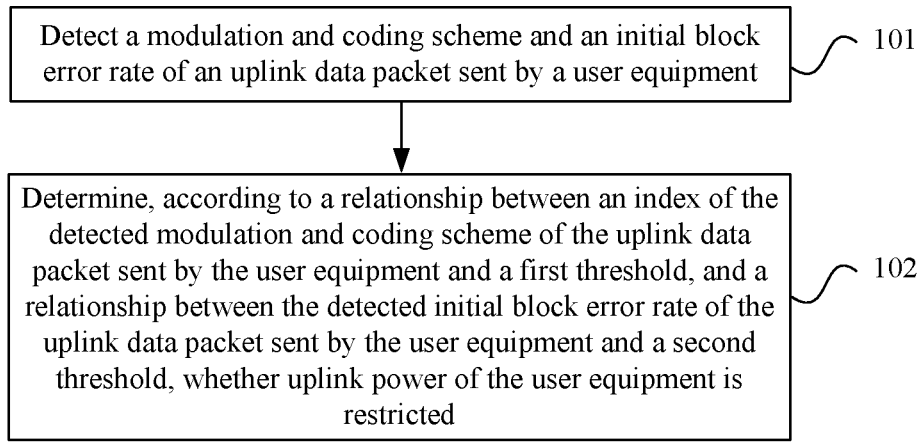
FIG. 1 is a flowchart of a method for detecting uplink power according to an embodiment of the present invention.

FIG. 1 is a flowchart of a method for detecting uplink power according to an embodiment of the present invention. As shown in FIG. 1, the method includes:

Step 101: Detect a modulation and coding scheme and an initial block error rate of an uplink data packet sent by a user equipment.

For an uplink data packet sent by a UE, a base station device may detect a modulation and coding scheme (Modulation and Coding Scheme, hereinafter briefly referred to as MCS) of the received uplink data packet and an initial block error rate (Initial Block Error Rate, hereinafter briefly referred to as IBLER) of the uplink data packet. It should be noted that, in a GSM system, the base station device may be a base transceiver station (Base Transceiver Station, BTS); in a WCDMA (Wideband Code Division Multiple Access, wideband code division multiple access) system and a TD-SCDMA (Time Division-Synchronous Code Division Multiple Access, time division-synchronous code division multiple access) system, the base station device may be a NodeB; and in an LTE system, the base station device may be an evolved base station (eNodeB).

There is a plurality of ways to detect the modulation and coding scheme and initial block error rate of the uplink data packet sent by the user equipment. For example, reference may be made to the prior art.

Step 102: Determine, according to a relationship between an index of the detected modulation and coding scheme of the uplink data packet sent by the user equipment and a first threshold, and a relationship between the detected initial block error rate of the uplink data packet sent by the user equipment and a second threshold, whether uplink power of the user equipment is restricted.

The base station device may determine, according to the detected MCS and IBLER of the uplink data packet sent by the user equipment, whether the uplink power of the user equipment is restricted. For example, when the base station device detects that there are a predetermined number of uplink data packets sent by the user equipment whose MCS index are smaller than or equal to a preset threshold A (that is, the first threshold), the base station device determines whether the IBLER is larger than another preset threshold B (that is, the second threshold). If the IBLER is larger than the threshold B, the base station device may determine that the uplink power of the user equipment is restricted.

In the embodiment of the present invention, a base station device can detect an MCS and an IBLER of an uplink data packet sent by a UE, and can determine, according to the detected MCS and IBLER, whether uplink power of the UE is restricted, thereby characterizing an uplink signal restriction situation of the UE more accurately.

Figure 2:
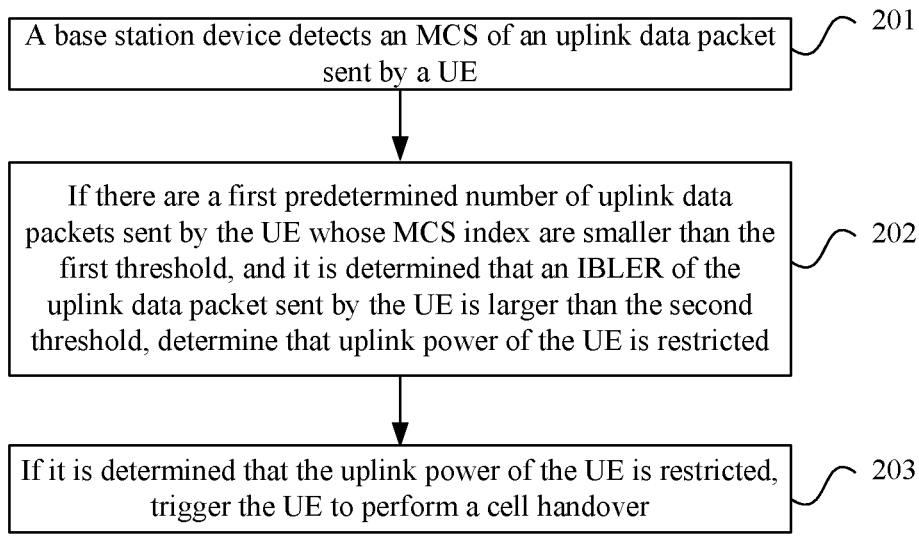
FIG. 2 is a flowchart of a method for detecting uplink power according to another embodiment of the present invention.

FIG. 2 is a flowchart of a method for detecting uplink power according to another embodiment of the present invention. As shown in FIG. 2, the method includes:

Step 201: A base station device detects an MCS of an uplink data packet sent by a UE.

In this step, the base station device performs MCS detection on the UE. The MCS detection process may be as follows: The base station device obtains an MCS of each uplink data packet sent by the UE, and compares an obtained MCS with a threshold, for example, a first threshold.

Step 202: If there are a first predetermined number of uplink data packets sent by the UE whose MCS index are smaller than the first threshold, and it is determined that an IBLER of the uplink data packet sent by the UE is larger than the second threshold, determine that uplink power of the UE is restricted, where the first predetermined number of uplink data packets whose MCS index are smaller than the first threshold are consecutive.

If the base station device detects that there are consecutive N1 uplink data packets sent by the UE whose MCS index are smaller than the preset first threshold, the base station device may determine an IBLER of an uplink data packet sent by the UE. For example, the base station device may enable statistics about the IBLER of the uplink data packet sent by the UE, that is, start to collect statistics about the IBLER of the uplink data packet sent by the UE. N1 is the first predetermined number, and N1 is configurable. The first threshold, for example, may be 1-28 and may be set to a specific value as required.

It should be noted that, when the base station device is collecting statistics about the number of consecutive uplink data packets that are sent by the UE and whose MCS index are smaller than the first threshold, an interval between two consecutive uplink data packets may not be restricted, or an interval between two consecutive uplink data packets may be restricted. A situation where the interval is restricted, for example, may be as follows: If an interval between two consecutive uplink data packets is larger than a preset threshold, for example, a fifth threshold, the statistics this time is stopped and a next statistics is started. In other words, in this step, when an interval between two consecutive uplink data packets among the uplink data packets sent by the user equipment is smaller than or equal to a preset threshold, it may be considered that the statistics is valid.

If the base station device does not detect that there are consecutive N1 uplink data packets sent by the UE whose MCS index are smaller than the preset first threshold, it indicates that an uplink is stable, and subsequent IBLER statistics may not be collected. At this time, the base station device may continue to detect an MCS of an uplink data packet sent by the UE.

Specifically, the base station device may detect the IBLER of the uplink data packet sent by the UE in the following manners:

A first manner: An IBLER of an uplink data packet sent by the UE and received in a first time period is detected, where the first time period is, for example, a preset time period T1.

For example, it may be as follows: An IBLER statistics period is set to the first time period T1. The base station device, according to formula 1, collects statistics about an IBLER of all uplink data packets that are sent by the UE and received in the period T1, where $$IBler = \frac{CntCorrect}{CntCorrect + CntIncorrect} \quad \text{Formula 1}$$

where CntCorrect indicates the number of blocks demodulated correctly by the base station device in a statistics period, and CntIncorrect indicates the number of blocks demodulated incorrectly by the base station device in the statistics period.

A second manner: An IBLER of a second predetermined number of uplink data packets sent by the UE is detected, where the second predetermined number of uplink data packets are consecutive, and the second predetermined number is a preset statistics number.

For example, it may be as follows: The IBLER statistics number is set to N2. When detection of the IBLER of the uplink data packet sent by the UE is enabled, the base station device starts collecting statistics about the number of blocks demodulated correctly and the number of blocks demodulated incorrectly. When the statistics about the total number of blocks is N2, statistics about an IBLER of these uplink data packets may be collected according to the formula 1. In the formula, CntCorrect indicates the number of blocks demodulated correctly by the base station device among a predetermined statistics number (N2), and CntIncorrect indicates the number of blocks demodulated incorrectly by the base station device among the predetermined statistics number.

A third manner: If in a second time period, the number of received uplink data packets sent by the UE is larger than or equal to a third threshold, an initial block error rate of an uplink data packet sent by the UE and received in the second time period is detected.

The manner, for example, may be as follows: collecting statistics about the IBLER of the uplink data packet sent by the UE and received in the second time period, and collecting statistics about the number of uplink data packets that are sent by the UE and received in the second time period; if in the second time period, the number of received uplink data packets sent by the UE is larger than or equal to the third threshold, it is considered that the statistical IBLER is valid, and the statistical IBLER is compared with the second threshold; if in the second time period, the number of received uplink data packets sent by the UE is smaller than the third threshold, it is considered that the statistical IBLER is invalid, the statistical IBLER is not compared with the second threshold, and statistics about an IBLER in a next time period may be collected. This process repeats until the number of uplink data packets that are sent by the UE and received in a time period is larger than or equal to the third threshold. Then, the statistical IBLER is compared with the second threshold. The second time period is a preset time period, and may be equal to the first time period or may not be equal to the first time period.

It should be noted that, in this manner, when the number of uplink data packets that are sent by the UE and received in a period T2 is sufficient enough, a statistical IBLER collected in the period T2 is used as the detected IBLER, thereby improving accuracy of the IBLER detection in the period T2, which makes a result of determining whether uplink power is restricted based on the IBLER more accurate.

After detecting the IBLER, the base station device may compare the detected IBLER with the preset second threshold. If the IBLER is larger than the second threshold, it indicates that the uplink is not stable enough, and the base station device may determine that the uplink power of the UE is restricted. If the IBLER is smaller than or equal to the second threshold, it indicates that the uplink is stable. At this time, IBLER statistics of a next period may be started. The second threshold, for example, may be 0-1 and may be set to a specific value as required.

Furthermore, after the base station device detects that the uplink power of the UE is restricted, the base station device may trigger the UE to perform a handover, thereby reducing the call drop rate of the UE.

Step 203: If it is determined that the uplink power of the UE is restricted, trigger the UE to perform a cell handover.

For example, after determining that the uplink power of the UE is restricted, the base station device may trigger the UE to perform intermittent neighboring cell (GAP) measurement to measure the signal quality of an inter-frequency or inter-system neighboring cell. If the signal quality meets a requirement (for example, meeting an event that triggers a handover), the UE is triggered to perform the cell handover. The GAP measurement may be inter-frequency GAP measurement or may also be inter-system GAP measurement. When this embodiment is applied to an inter-frequency network, the GAP measurement is inter-frequency GAP measurement. When the embodiment is applied to inter-system, the GAP measurement is inter-system GAP measurement.

When a measurement report reported by the UE meets a requirement, the base station device may decide to initiate a handover.

The method may further include the following steps:

Step 202B: When the base station device is detecting the IBLER of the uplink data packet sent by the UE, the base station device continues to detect the MCS of the uplink data packet sent by the UE.

Step 202C: If the base station device detects that there are a third predetermined number of uplink data packets sent by the UE whose MCS index are larger than a fourth threshold, the base station device may stop detecting the IBLER of the uplink data packet sent by the UE, that is, stop the action of obtaining the IBLER of the uplink data packet sent by the UE in step 202. The third predetermined number of uplink data packets whose modulation and coding scheme index are larger than the fourth threshold are consecutive. The third predetermined number and the first predetermined number are two independent parameters, which may be set separately as required. The fourth threshold may be set specifically as required, and the fourth threshold is larger than or equal to the first threshold.

After the step 202B and the step 202C are added, when the base station device detects that there are the third predetermined number of consecutive uplink data packets sent by a UE whose MCS index are larger than the third threshold, it indicates that the uplink of the UE is stable currently, and the cell handover may not be performed. Therefore, statistics about the IBLER of the uplink data packet may not be collected either. However, the step 202B and the step 202C are optional and are not shown in the figure.

It should be noted that, in another embodiment manner, the step 202 in this embodiment may be replaced by the following step 202', where the step 202' is as follows:

If in the preset time, there are the first predetermined number of uplink data packets sent by the UE whose MCS index are smaller than the first threshold, and it is determined that the IBLER of the uplink data packet sent by the UE is larger than the second threshold, determine that the uplink power of the UE is restricted.

Specifically, the step 202' may be as follows: For an uplink data packet sent by a UE, in a preset time segment, if there are a certain number of uplink data packets whose MCS index are smaller than the first threshold, and it is determined that the IBLER of the uplink data packet sent by the UE is larger than the second threshold, it is determined that the uplink power of the UE is restricted, where the uplink data packets whose MCS index are smaller than the first threshold may be inconsecutive. For example, a timer is enabled from the moment when the detection starts. Before the timer does not time out, if there are a predetermined number of uplink data packets whose MCS index are smaller than the first threshold, the base station device may determine the IBLER of the uplink data packet sent by the UE, so as to determine whether the uplink power of the UE is restricted. For the process where the base station device determines the IBLER of the uplink data packet, reference is made to the description in the step 202.

The embodiment may use an MCS and an IBLER as criteria for determining whether uplink power is restricted. That is to say, when there are a certain number of uplink data packets whose MCS index are smaller than a first threshold, and an IBLER in a subsequent preset length of time is larger than a second threshold, a base station device determines that the uplink power of a UE is restricted and may perform a cell handover for the UE. The first threshold and the second threshold may be set based on an actual condition of a system.

The embodiment of the present invention, by detecting an MCS and an IBLER, can accurately characterize an uplink signal restriction situation of a UE and can initiate a handover in time when finding that the uplink of the UE is restricted, thereby reducing the call drop rate of the UE.

Persons of ordinary skill in the art may understand that, all or a part of the steps in the method embodiments may be implemented by a computer program instructing relevant hardware. The program may be stored in a computer readable storage medium. When the program is run, the steps in the method embodiments are performed. The storage medium includes any medium that can store program codes, such as a ROM, a RAM, a magnetic disk, or an optical disk.

Figure 3:
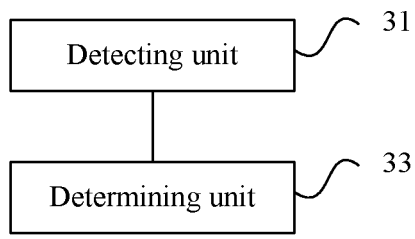
FIG. 3 is a schematic diagram of an apparatus for detecting uplink power according to an embodiment of the present invention.

FIG. 3 is a schematic diagram of an apparatus for detecting uplink power according to an embodiment of the present invention. As shown in FIG. 3, the apparatus includes a detecting unit 31 and a determining unit 33.

The detecting unit 31 is configured to detect a modulation and coding scheme and an initial block error rate of an uplink data packet sent by a user equipment.

The determining unit 33 is configured to determine, according to a relationship between an index of the detected modulation and coding scheme of the uplink data packet sent by the user equipment and a first threshold, and a relationship between the detected initial block error rate of the uplink data packet sent by the user equipment and a second threshold, whether uplink power of the user equipment is restricted.

For a detailed working process and working principle of each unit in this embodiment, reference is made to the description in the foregoing method embodiments, and details are not described herein again.

In the embodiment of the present invention, the detecting unit detects an MCS and an IBLER of an uplink data packet sent by a UE, and the determining unit can determine, according to the detected MCS and IBLER, whether uplink power of the UE is restricted, thereby characterizing an uplink signal restriction situation of the UE more accurately.

Figure 4:
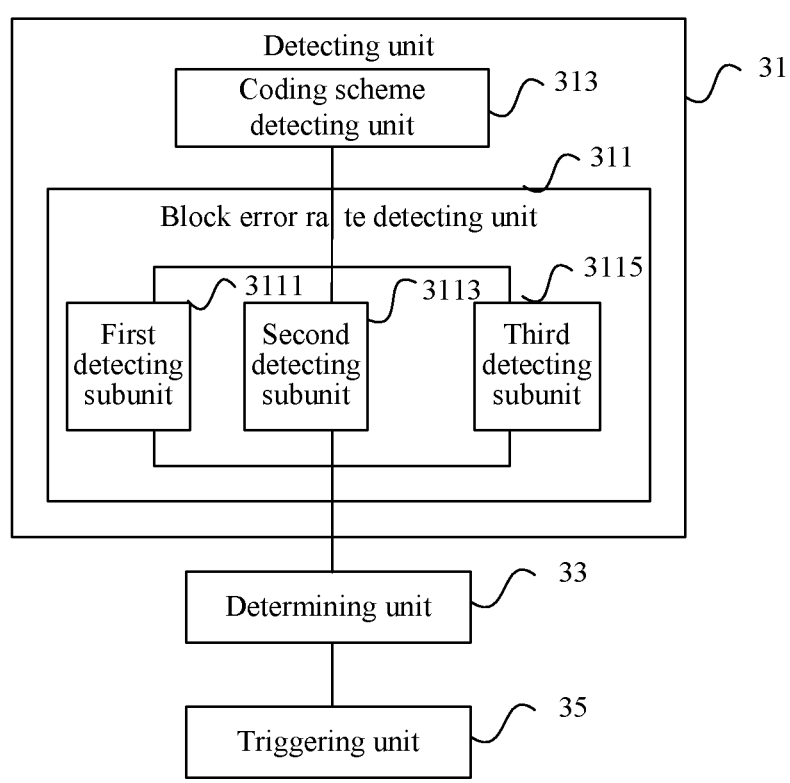
FIG. 4 is a schematic diagram of an apparatus for detecting uplink power according to another embodiment of the present invention.

FIG. 4 is a schematic diagram of an apparatus for detecting uplink power according to another embodiment of the present invention. On the basis of the embodiment shown in FIG. 3, as shown in FIG. 4:

The determining unit 33 may be specifically configured to: if there are a first predetermined number of uplink data packets sent by the user equipment whose a modulation and coding scheme index are smaller than the first threshold, and it is determined that the initial block error rate of the uplink data packet sent by the user equipment is larger than the second threshold, determine that the uplink power of the user equipment is restricted, where the first predetermined number of uplink data packets whose modulation and coding scheme index are smaller than the first threshold are consecutive. Furthermore, an interval between two consecutive uplink data packets among the uplink data packets sent by the user equipment may be smaller than or equal to a preset fifth threshold, that is, when collecting statistics about the number of consecutive uplink data packets whose modulation and coding scheme index are smaller than the first threshold, if an interval between two consecutive data packets is smaller than or equal to a preset threshold, it may be considered that the statistics is valid.

Alternatively, the determining unit 33 may be specifically configured to: if in a preset time, there are the first predetermined number of uplink data packets sent by the user equipment whose modulation and coding scheme index are smaller than the first threshold, and it is determined that the initial block error rate of the uplink data packet sent by the user equipment is larger than the second threshold, determine that the uplink power of the user equipment is restricted.

The detecting unit 31 may include a block error rate detecting unit 311 configured to detect an initial block error rate. The block error rate detecting unit 311 includes a first detecting subunit 3111, a second detecting subunit 3113, or a third detecting subunit 3115.

The first detecting subunit 3111 is configured to detect an initial block error rate of an uplink data packet sent by the user equipment and received in a first time period. The second detecting subunit 3113 is configured to detect an initial block error rate of a second predetermined number of uplink data packets sent by the user equipment, where the second predetermined number of uplink data packets are consecutive. The third detecting subunit 3115 is configured to: if in a second time period, the number of received uplink data packets sent by the user equipment is larger than or equal to a third threshold, detect an initial block error rate of an uplink data packet sent by the user equipment and received in the second time period.

Furthermore, the detecting unit 31 may further include a coding scheme detecting unit 313 configured to detect a modulation and coding scheme.

The coding scheme detecting unit 313 is further configured to: when the block error rate detecting unit 311 is detecting the initial block error rate of the uplink data packet sent by the user equipment, detect the modulation and coding scheme of the uplink data packet sent by the user equipment.

The block error rate detecting unit 311 is further configured to: if the coding scheme detecting unit 313 detects that there are a third predetermined number of uplink data packets sent by the user equipment whose modulation and coding scheme index are larger than a fourth threshold, stop detecting the initial block error rate of the uplink data packet sent by the user equipment.

Furthermore, the apparatus for detecting uplink power may further include a triggering unit 35.

The triggering unit 35 is configured to: if the determining unit 33 determines that the uplink power of the user equipment is restricted, trigger the user equipment to perform a cell handover.

Specifically, the triggering unit 35 may be configured to: if the determining unit 33 determines that the uplink power of the user equipment is restricted, trigger intermittent neighboring cell measurement, so as to perform the cell handover, where the intermittent neighboring cell measurement is inter-frequency intermittent neighboring cell measurement or inter-system intermittent neighboring cell measurement.

For a detailed working process and working principle of each unit in this embodiment, reference is made to the description in the foregoing method embodiments, and details are not described herein again.

In the embodiment of the present invention, a detecting unit detects an MCS and an IBLER of an uplink data packet sent by a UE, and a determining unit can determine, according to the detected MCS and IBLER, whether uplink power is restricted, thereby characterizing an uplink signal restriction situation of the UE more accurately. In addition, a triggering unit can initiate a handover in time when finding that the uplink of the UE is restricted, reducing the call drop rate of the UE.

An embodiment of the present invention further provides a base station device. The base station device includes any one of the apparatuses for detecting uplink power that are provided by the embodiment shown in FIG. 3 or FIG. 4.

For a detailed working process and working principle of each unit in this embodiment, reference is made to the description in the foregoing method embodiments, and details are not described herein again.

In the embodiment of the present invention, a base station device detects an MCS and an IBLER of an uplink data packet sent by a UE, and can determine, according to the detected MCS and IBLER, whether uplink power of the UE is restricted, thereby characterizing an uplink signal restriction situation of the UE more accurately. In addition, the base station device can initiate a handover in time when finding that the uplink of the UE is restricted, reducing the call drop rate of the UE.

It should be noted that, the method, apparatus, and base station device in the embodiments of the present invention may be applied to inter-system or an inter-frequency network of an LTE system, for example, a UMTS (Universal Mobile Telecommunications System, universal mobile telecommunications system, which is a 3G mobile communication technology standard) or a GSM (Global System for Mobile Communications, global system for mobile communications, which is a 2G mobile communication technology standard), another system called LTE (Long Term Evolution, long term evolution project), and a UE can be handed over from the LTE to the UMTS or GSM. However, an inter-frequency network may refer to that a system includes different frequency bands, and may be divided into a plurality of cells according to a frequency band, and a UE may be handed over from one cell to another cell. The method, apparatus, and base station device in the embodiments of the present invention may also be applied to a communication network in another scenario, for example, any scenario where uplink power of a user equipment needs to be determined. The embodiments of the present invention do not restrict it.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as these modifications or replacements do not make the essence of corresponding technical solutions depart from the spirit and scope of the technical solutions of the embodiments of the present invention.

What is claimed is:

1. A method for cell handover, comprising:
determining, by a base station, whether uplink power of a user equipment (UE) is restricted according to a modulation and coding scheme and an initial block error rate of an uplink data packet sent from the UE;
triggering, by the base station, the UE to measure a signal quality of an inter-frequency or an inter-system neighboring cell in a case that the uplink power of the UE is determined to be restricted; and
triggering, by the base station, the UE to perform a cell handover in a case that the signal quality of the neighboring cell meets an event of triggering the cell handover;
wherein the uplink power of the UE is determined to be restricted when a first determined number of uplink data packets sent from the UE have modulation and coding scheme index is smaller than a first threshold, and an initial block error rate of the uplink data packet is larger than a second threshold;
wherein, the first determined number of uplink data packets having the modulation and coding scheme index smaller than the first threshold are consecutive uplink data packets.

2. The method according to claim 1, wherein the triggering, by the base station, the UE to measure the signal quality, comprises:
triggering, by the base station, the UE to perform intermittent neighboring cell (GAP) measurement to measure the signal quality of the inter-frequency or the inter-system neighboring cell.

3. The method according to claim 1, wherein an interval between two consecutive uplink data packets among the uplink data packets sent from the UE is smaller than or equal to a preset fifth threshold.

4. The method according to claim 1, wherein the detecting of the initial block error rate of the uplink data packet sent from the UE comprises:
detecting the initial block error rate of the uplink data packet sent from the UE that is received in a first time period; or
detecting an initial block error rate of a second determined number of uplink data packets sent from the UE, wherein the second determined number of uplink data packets are consecutive; or
detecting an initial block error rate of an uplink data packet sent from the UE that is received in a second time period, upon determining in the second time period, a number of received uplink data packets sent from the UE is larger than or equal to a third threshold.

5. A base station device, comprising:
a receiver, configured to receive an uplink data packet sent from a user equipment (UE);
a processor, configured to determine whether uplink power of the UE is restricted according to a modulation and coding scheme and an initial block error rate of the uplink data packet, to trigger the UE to measure a signal quality of an inter-frequency or an inter-system neighboring cell in a case that the uplink power of the UE is determined to be restricted, to trigger the UE to perform a cell handover in a case that the signal quality of the neighboring cell meets an event of triggering the cell handover;
wherein the processor is configured to determine that the uplink power of the UE is restricted when a first determined number of uplink data packets sent from the UE have modulation and coding scheme index is smaller than the first threshold, and the initial block error rate of the uplink data packet is larger than the second threshold;
wherein the first determined number of uplink data packets having the modulation and coding scheme index smaller than the first threshold are consecutive uplink data packets.

6. The base station device according to claim 5, wherein the processor is configured to trigger the UE to perform intermittent neighboring cell (GAP) measurement to measure the signal quality of the inter-frequency or the inter-system neighboring cell.

7. The base station device according to claim 5, wherein the processor is further configured to:
detect the initial block error rate of the uplink data packet sent from the UE that is received in a first time period; or
detect an initial block error rate of a second determined number of uplink data packets sent from the UE, wherein the second determined number of uplink data packets are consecutive; or detect an initial block error rate of an uplink data packet sent from the UE that is received in a second time period, upon determining in the second time period, a number of received uplink data packets sent from the UE is larger than or equal to a third threshold.

8. A communication system, comprising a user equipment (UE) and a base station device, wherein the base station device, comprises:

a receiver, configured to receive an uplink data packet sent from the UE;

a processor, configured to determine whether uplink power of the UE is restricted according to a modulation and coding scheme and an initial block error rate of the uplink data packet, to trigger the UE to measure a signal quality of an inter-frequency or an inter-system neighboring cell in a case that the uplink power of the UE is determined to be restricted, to trigger the UE to perform cell handover in a case that the signal quality of the neighboring cell meets an event that triggers the cell handover;

wherein the processor is configured to determine that the uplink power of the UE is restricted when a first determined number of uplink data packets sent from the UE have modulation and coding scheme index is smaller than the first threshold, and the initial block error rate of the uplink data packet is larger than the second threshold;

wherein the first determined number of uplink data packets having the modulation and coding scheme index smaller than the first threshold are consecutive uplink data packets.

9. The communication system according to claim 8, wherein the processor is configured to trigger the UE to perform intermittent neighboring cell (GAP) measurement to measure the signal quality of the inter-frequency or the inter-system neighboring cell.

10. The communication system according to claim 8, wherein the processor is further configured to:

detect the initial block error rate of the uplink data packet sent from the UE that is received in a first time period; or detect an initial block error rate of a second determined number of uplink data packets sent from the UE, wherein the second determined number of uplink data packets are consecutive; or detect an initial block error rate of an uplink data packet sent from the UE that is received in a second time period, upon determining in the second time period, a number of received uplink data packets sent from the UE is larger than or equal to a third threshold.

* * * * *